(12) United States Patent
Osborne

(10) Patent No.: US 7,990,737 B2
(45) Date of Patent: Aug. 2, 2011

(54) MEMORY SYSTEMS WITH MEMORY CHIPS DOWN AND UP

(75) Inventor: Randy B. Osborne, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1056 days.

(21) Appl. No.: 11/317,778

(22) Filed: Dec. 23, 2005

(65) Prior Publication Data

US 2007/0147016 A1    Jun. 28, 2007

(51) Int. Cl.
*H05K 1/11* (2006.01)
*H05K 1/14* (2006.01)

(52) U.S. Cl. .......... 361/803; 361/764; 361/783; 361/778

(58) Field of Classification Search .......... 361/760–766, 361/803; 365/63, 65
See application file for complete search history.

(56) References Cited

U.S. PATENT DOCUMENTS

| | | | |
|---|---|---|---|
| 5,974,513 A | 10/1999 | Matsuo et al. | |
| 5,991,819 A | 11/1999 | Young | |
| 6,273,759 B1 | 8/2001 | Perino et al. | |
| 6,438,012 B1 | 8/2002 | Osaka et al. | |
| 6,674,648 B2 | 1/2004 | McCall et al. | |
| 6,742,098 B1 | 5/2004 | Halbert et al. | |
| 6,766,385 B2 | 7/2004 | Dodd et al. | |
| 6,785,190 B1 | 8/2004 | Bains et al. | |
| 6,831,924 B1 | 12/2004 | Cornett et al. | |
| 6,877,071 B2 | 4/2005 | Sherman | |
| 6,889,304 B2 * | 5/2005 | Perego et al. | 711/170 |
| 6,954,822 B2 | 10/2005 | Bains et al. | |
| 6,961,831 B2 | 11/2005 | Ware et al. | |
| 7,024,518 B2 | 4/2006 | Halbert et al. | |
| 7,411,806 B2 * | 8/2008 | Funaba et al. | 365/63 |
| 2001/0040796 A1 | 11/2001 | Kollipara et al. | |
| 2002/0023191 A1 | 2/2002 | Fudeyasu | |
| 2002/0084458 A1 * | 7/2002 | Halbert et al. | 257/63 |
| 2002/0144166 A1 | 10/2002 | Chang et al. | |
| 2004/0236921 A1 | 11/2004 | Bains | |
| 2005/0071536 A1 | 3/2005 | Osborne | |
| 2005/0071541 A1 | 3/2005 | Osborne | |
| 2005/0091460 A1 | 4/2005 | Rotithor et al. | |
| 2005/0108469 A1 | 5/2005 | Freeman et al. | |
| 2005/0144375 A1 | 6/2005 | Bains et al. | |

OTHER PUBLICATIONS

"PCT/US2006/047114 International Search Report and Written Opinion", (May 7, 2007).
Office Action Received for Chinese Patent Application No. 200680041302.7, mailed on Apr. 8, 2011, 4 pages of Office Action and 5 pages of English translation and pending claims.

* cited by examiner

*Primary Examiner* — Tuan T Dinh
(74) *Attorney, Agent, or Firm* — Caven & Aghevli LLC

(57) ABSTRACT

In some embodiments, a system includes a memory controller chip, memory chips on a first substrate, and a module connector. A first group of conductors is included to provide read data signals from at least some of the memory chips to the memory controller chip, and a second group of conductors to provide read data signals from the connector to the memory controller chip. The module connector may receive a continuity card or memory module. Other embodiments are described.

12 Claims, 6 Drawing Sheets

MEMORY SYSTEMS WITH MEMORY CHIPS DOWN AND UP

BACKGROUND

1. Technical Field

The present inventions relate to memory systems with memory chips on a motherboard (down) and a connector to receive a continuity module or a memory module with additional memory chips (up).

2. Background Art

Various arrangements for memory chips in a memory system have been proposed. For example, in a typical synchronous dynamic random access memory (SDRAM) system, memory chips communicate data through bidirectional data buses and receive commands and addresses through command and addresses buses. The memory chips have stubs that connect to the buses in a multi-drop configuration (coupling three or more points). Other designs include point-to-point signaling (coupling two points). The point-to-point signaling may be unidirectional or bidirectional. The signaling may be single ended or differential. In some systems, address, command, and write data may be on the same conductors.

Many computer systems include a motherboard to which various chips and connectors are attached. Motherboards are typically printed circuit boards (PCBs). Conductors between chips and connectors on the motherboard are either on the surface of the motherboard or in between layers of the motherboard. The conductors may be formed of a different materials including, for example, vias between layers.

The connectors on the motherboards receive cards which are typically PCBs. Examples of the cards are memory modules and continuity modules. Memory modules include a substrate supporting memory chips on one or both sides of the substrate. A dual-in line memory module (DIMM) is an example of a memory module. When a memory module is not used, a continuity module is sometimes inserted in a connector to terminate signals or to connect conductors to other conductors. Memory modules may also include termination circuits to terminate signals received by the memory modules. The connectors typically include pads or other conductive surfaces to receive fingers or other conductive surfaces of the memory or continuity modules. For various reasons (such as cost, technological, or standard reasons), there can be limits on the number of fingers or conductive surfaces on the connector and modules.

Some computer systems having included some memory chips on a motherboard and other memory chips on a memory module or other card in a connector on the motherboard.

A channel includes a group of conductors between the memory controller and memory chips. There may be a series of memory chips on a channel. Some memory systems have one channel and some more than one channel with modules in parallel. Modules may be in series.

Ranks refer to memory chips that are accessed together. More than one rank can be put on a memory module, but additional ranks per module can be expensive.

In some memory systems, the memory chips receive signals and repeat them to other memory chips as well as provide requested data signals to next memory chips. The data signals can be provided to the memory controller through point-to-point unidirectional return links that are repeated back or return in a looped fashion from a last memory chip.

Memory controllers have been used in chipset hubs and in a chip that includes a processor core. Some computer systems include wireless transmitter and receiver circuits.

BRIEF DESCRIPTION OF THE DRAWINGS

The inventions will be understood more fully from the detailed description given below and from the accompanying drawings of embodiments of the inventions which, however, should not be taken to limit the inventions to the specific embodiments described, but are for explanation and understanding only.

DETAILED DESCRIPTION

Figure 1:
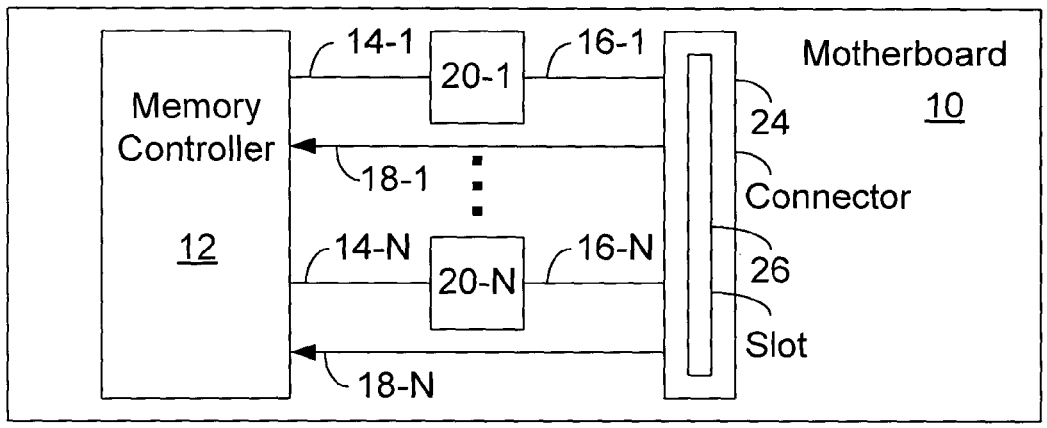
FIGS. 1 and 2 are each a block diagram representation of system including a memory controller chip, memory chips, a module connector, each on a motherboard according to some embodiments of the inventions.

Referring to FIG. 1, a memory controller chip 12, memory chips 20-1 . . . 20-N, and module connector 24 are on a motherboard 10. The boxes for memory chips 20-1 . . . 20-N each represent one or more than one memory chip depending on the particular embodiment. Conductors 14-1 . . . 14-N and 16-1 . . . 16-N represent various arrangements of conductors and may carry write data, command, address, read data, and clock signals. Conductors 18-1 . . . 18-N may carry read data signals and clock signals. Connector 24 includes a slot 26 to receive a memory module or a continuity module. Memory chips 42-1, 210-1, 212-1, 214-1, and 216-1 in FIGS. 2 and 5-14 are examples of box 20-1. The memory chips may be DRAMs or other type of memory chips. The various memory chips in FIGS. 1-3 and 5-14 may all be identical or some of them may be different.

Memory chips 20-1 . . . 20-N and at least some of the other memory chips described herein have the ability to change between a different number of active read data lanes. As an example, the memory chips can switch between being in a X4 mode (in which there are four active read data lanes per chip) and a X8 mode (in which there are eight active data lanes per chip). Examples of changes between these modes are provided below. Changes may be between other than merely X4 and X8 modes. In some embodiments, the mode cannot changed after boot up while the system is in operation, and in other embodiments the change may occur as a memory module is inserted into or removed from connector slot 26 in a hot plug operation.

Figure 2:
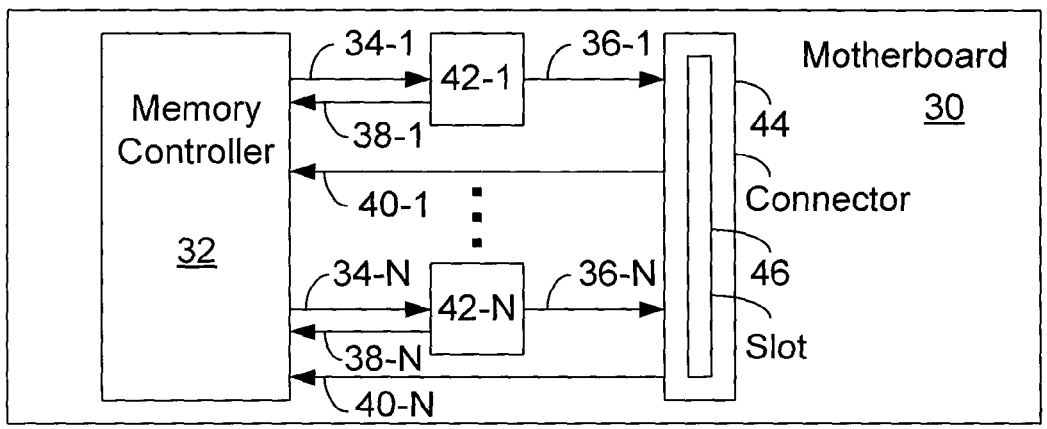

In FIG. 2, a memory controller chip 32, memory chips 42-1 . . . 42-N, and module connector 44 are on a motherboard 30. The boxes for memory chips 42-1 . . . 42-N each represent one memory chip. Conductors 34-1 . . . 34-N carry command, address, write data, and clock signals from memory controller 32 to memory chips 42-1 . . . 42-N. Read data signals from memory chips 42-1 . . . 42-N are provided through conductors 38-1 . . . 38-N to memory controller chip 32. If a continuity module is inserted in slot 46, memory chips 42-1 . . . 42-N provide read data signals on conductors 36-1 . . . 36-N to the continuity module which passes the read data signals through conductors 40-1 ... 40-N to memory controller chip 32. If a memory module is in slot 46, then conductors 36-1 ... 36-N carry address, command, write data, and clock signals to connector 44 to be received by memory chips on the module. Read data from the memory module memory chips is provided through conductors 40-1 ... 40-N to memory controller 32. Conductors 34-1 ... 34-N, 36-1 ... 36-N, 38-1 ... 38-N, and 40-1 ... 40-N may be point-to-point conductors. In other embodiments, some conductors are not point-to-point. Chip 32, connector 44, and slot 46 may be identical to or different than chip 12, connector 24, and slot 26.

Figure 3:
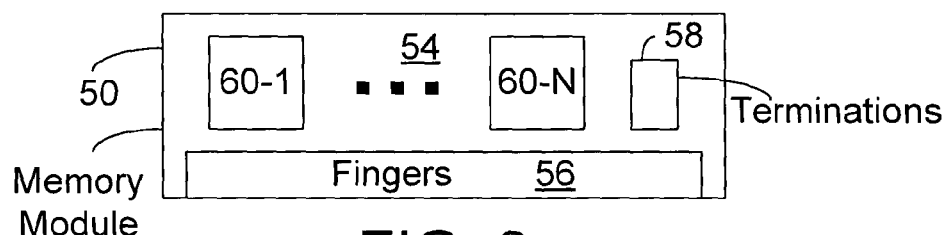
FIG. 3 is a block diagram representation of a memory module according to some embodiments of the inventions.

FIG. 3 illustrates a memory module 50 with a substrate 54, fingers 56 (to make contact with conductive elements in the connector slot), memory chips 60-1 ... 60-N (which may be identical to or different than the memory chips in FIGS. 1 and 2), and termination circuits 58 (which are not required to be included in all embodiments). The boxes of memory chips 60-1 ... 60-N each represent one or more than one memory chip depending on the particular embodiment. Memory chips 262-1, 264-1, 266-1, and 268-1 in FIGS. 6, 8, 10, 12, and 14 are examples of box 60-1. Some of the memory chips may be on the other side of substrate 54.

Figure 4:
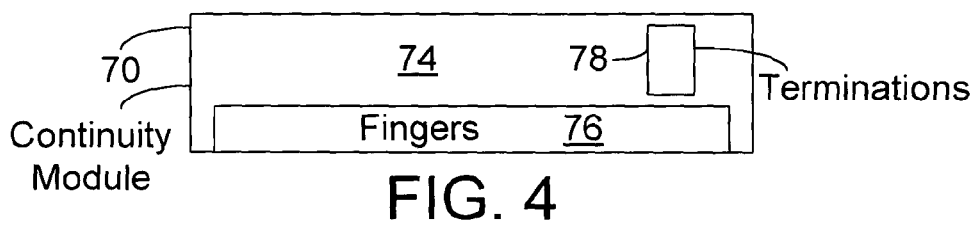
FIG. 4 is a block diagram representation of a continuity module according to some embodiments of the inventions.

FIG. 4 illustrates a continuity module 70 with a substrate 74, fingers 76, and termination circuits 78 (which are not required to be included in all embodiments).

Figure 5:
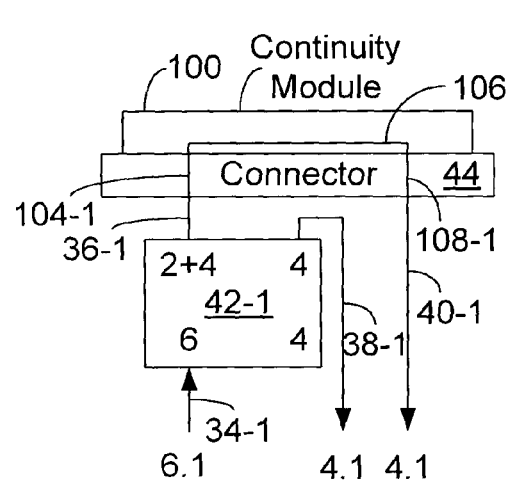
FIGS. 5-14 are each a block diagram representation of a system including at least one memory chip, a connector, and a module according to some embodiments of the inventions.
Figure 6:
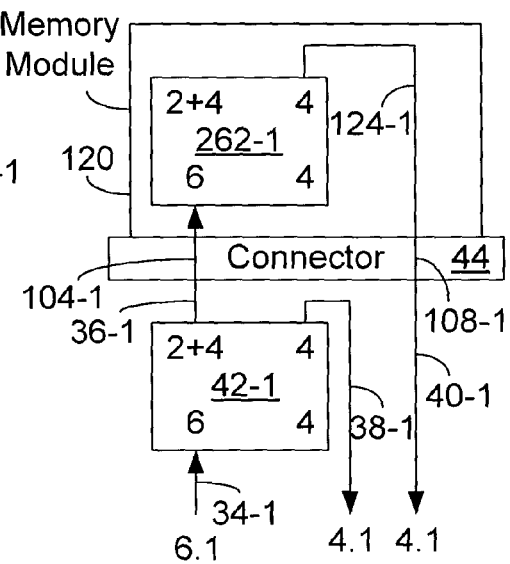

FIGS. 5 and 6 illustrate some additional details with respect to the example of FIG. 2. In FIG. 5, continuity module 100 (which may be identical or different than continuity module 70) is inserted in connector 44. Memory chip 42-1 provides read data signals to conductors 36-1 and 38-1. Two outputs of chip 42-1 are inactive or terminated on continuity module 100. Continuity module 100 completes a path from conductors 36-1, to conductive elements 104-1, to conductors 106-1 in continuity module 100, to conductors 40-1. Conductors 38-1 and 40-1 are connected to memory controller chip 32 shown in FIG. 2. In a similar but different fashion, in FIG. 6, when memory module 120 is in connector 44, address, control, write data, and clock signals are provided through conductors 36-1 and conductive elements 104-1 to memory chip 262-1. Read data from memory chip 262-1 is provided through conductors 124-1, conductive elements 108-1, and conductors 40-1 to memory controller 32. Thus, in FIGS. 5 and 6, memory controller 32 gets the same number of bits of read data whether the continuity card or memory module is in the connector. However, in the FIG. 5, memory chip 42-1 is in a X8 mode providing 8 lanes of read data, whereas in FIG. 6, memory chips 42-1 and 262-1 are each in X4 modes, together combining for 8 lanes of read data. A conductor lane may include one conductor, or two conductors carrying differential signals.

The following is a description of nomenclature used in FIGS. 5-14. The memory chips (such as chip 42-1 in FIG. 5) include numbers "2+4" "4" "4" and "6." These represent a number of data, address, and command signal inputs or outputs of the memory chip. There are also clock inputs and outputs which are not indicated by the number on the chip, but which are included in the numbers "6.1" and "4.1." The number "6.1" indicates 6 address, command, and write data signals and 1 clock signal. The number "4.1" indicates 4 read data signals and 1 clock signal. For example, conductors 34-1 include 7 conductor lanes: 6 for write data, address, and command signals, and 1 for a clock signal. Conductors 36-1 represent 4 conductor lanes for read data and 1 clock signal conductor lane from chip 42-1. In the examples of FIGS. 5 and 6, chips 42-1 and 262-1 include 4 inputs that are not used, but may be used in other embodiments. These inputs do not have to be included, but make the memory chip more versatile if they are included. Of course, the inventions are not limited to a particular number of signals or lanes or other details shown or described.

Figure 7:
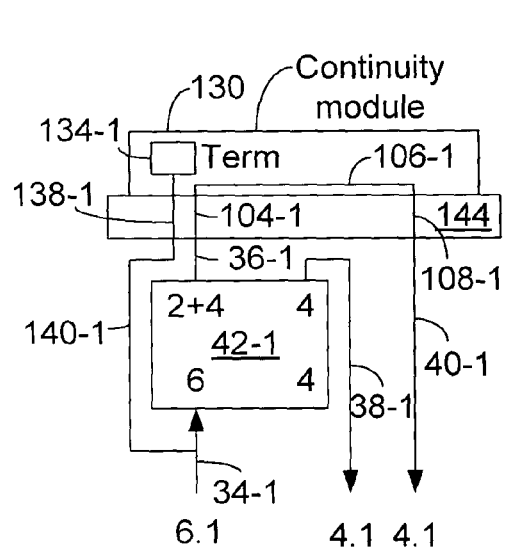
Figure 8:
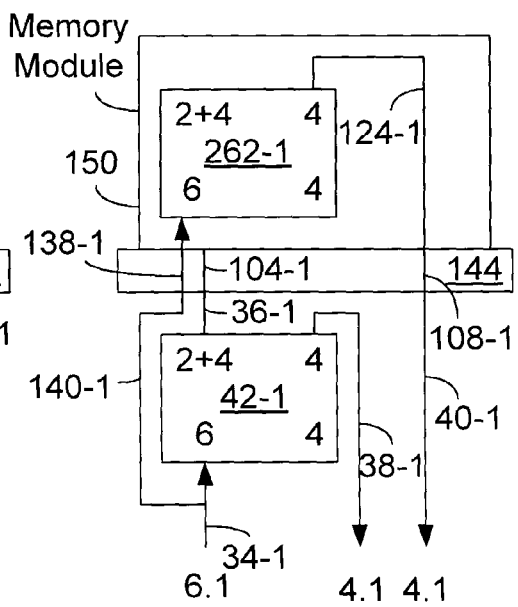

FIGS. 7 and 8 are similar to FIGS. 5 and 6. However, the systems of FIGS. 5 and 6 include conductors 140-1 to connect between conductors 34-1 and connector 144 through conductive elements 138-1 in a point to two point fashion. When continuity module 130 is inserted in connector 144, the signals on conductors 140-1 are terminated in termination circuits 134-1. When memory module 150 is inserted in connector 144, the signals on conductors 140-1 are provided to chip 262-1. Chip 42-1 causes its "2+4" outputs to be inactive or the signals on conductors 36-1 are terminated on memory module 150. Continuity modules 100 and 130, memory modules 120 and 150, and connectors 44 and 144 may be identical or different.

In FIGS. 9-14, conductors 34-1 and 38-1 are examples of conductors 14-1 of FIG. 1, conductors 36-1 are examples of conductors 16-1 of FIG. 1, and conductors 40-1 are examples of conductors 18-1 in FIG. 1.

Figure 9:
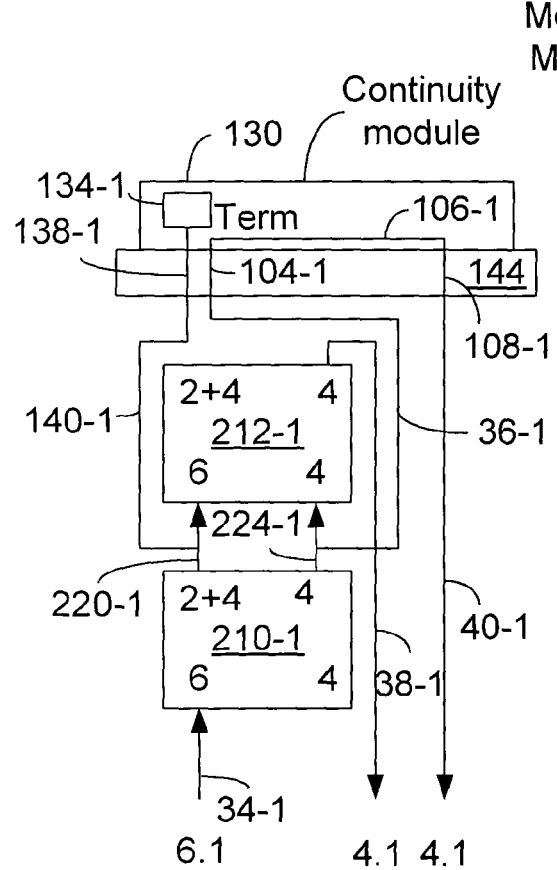
Figure 10:
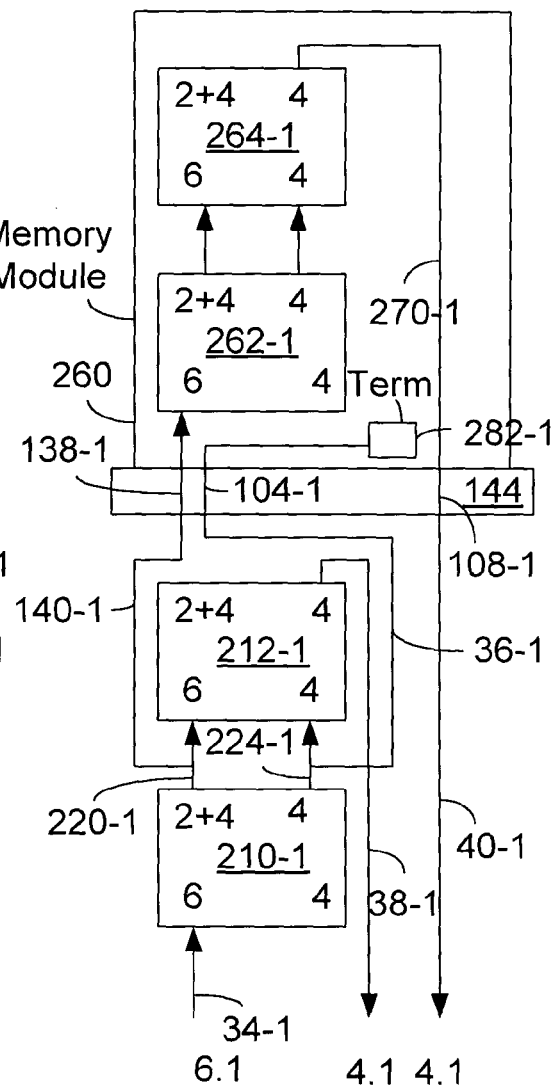

FIGS. 9 and 10 illustrates systems in which two memory chips (210-1 and 212-1) are used in place of memory chip 42-1 in FIGS. 7 and 8, and two memory chips (262-1 and 264-1) are used in memory module 260. In an actual system, there would be additional pairs of memory chips in parallel with chips 210-1 and 212-1 and with chips 262-1 and 264-1. If chips 210-1, 212-1, 262-1, and 264-1 each have the same capacity as chips 42-1 and 262-1 in FIG. 8, then the capacity of the memory system of FIG. 9 is double that of the memory systems of FIGS. 5 and 7, and the capacity of the memory system of FIG. 10 is double that of the memory system of FIGS. 6 and 8, all other things being equal.

Referring to FIG. 9, when continuity module 130 is inserted in connector 144, in some embodiments, in response to a read request, chip 210-1 provides read data signals through conductors 224-1, conductors 36-1, conductive elements 104-1, conductors 106-1, conductive elements 108-1, and conductors 40-1 to a memory controller such as memory controller 12 in FIG. 1. Address, command, write data, and clock signals are provided through 36-1 and are repeated from chip 210-1 to chip 212-1 through conductors 220-1. The signals on conductors 220-1 are also provided through conductors 140-1 to termination circuits 134-1 of continuity module 130.

Referring to FIG. 10, the following describes different embodiments when memory module 260 is inserted in connector 144. In some embodiments, for a particular transaction, a read request is addressed to either chip 210-1 or to chip 212-1, and to either chip 262-1 or chip 264-1. If the read request is addressed to only chip 210-1, the read data signals are passed through conductors 224-1 to chip 212-1 and repeated by chip 212-1 to conductors 38-1. Read data signals that are carried by conductors 36-1 are terminated by terminations circuits 282-1. If the read request is addressed to only chip 212-1, then that request is repeated through conductors 220-1 to chip 212-1. Likewise, a read request addressed to chip 262-1 starts on conductors 34-1, is repeated through chip 210-1 to conductors 220-1 and 140-1 to chip 262-1. The read data signals from chip 262-1 is repeated through chip 264-1 to conductors 270-1. Signals on conductors 270-1 are passed through conductive elements 108-1 to conductors 40-1. A read request addressed to chip 264-1 is repeated through chip 262-1 to 264-1 and the read data signals are provided to conductors 270-1. Write data to chip 212-1 is repeated through chip 210-1 and passes through conductors 220-1. Write data to chip 262-1 is repeated through chip 210-1 and passes through conductors 140-1. Write data to chip 264-1 is repeated to through chip 210-1 and chip 262-1 and passes through conductors 140-1.

In other embodiments, in a particular transaction, the read request is addressed to both chips 210-1 and 212-1 and to both chips 262-1 and 264-1. A portion of the read data signals come from each of the memory chips. The portion of read data signals in chip 210-1 is repeated through chip 212-1 and the portion of read data signals in chip 262-1 is repeated through chip 264-1. Likewise, part of the write data can be written to each. In some embodiments, the system can switch between (1) reading and writing to either chips 210-1 and 212-1 and to either chips 262-1 and 264-1 in a particular transaction, and (2) reading and writing to both chips 210-1 and 212-1 and to both chips 262-1 and 264-1 in a particular transaction.

Figure 11:
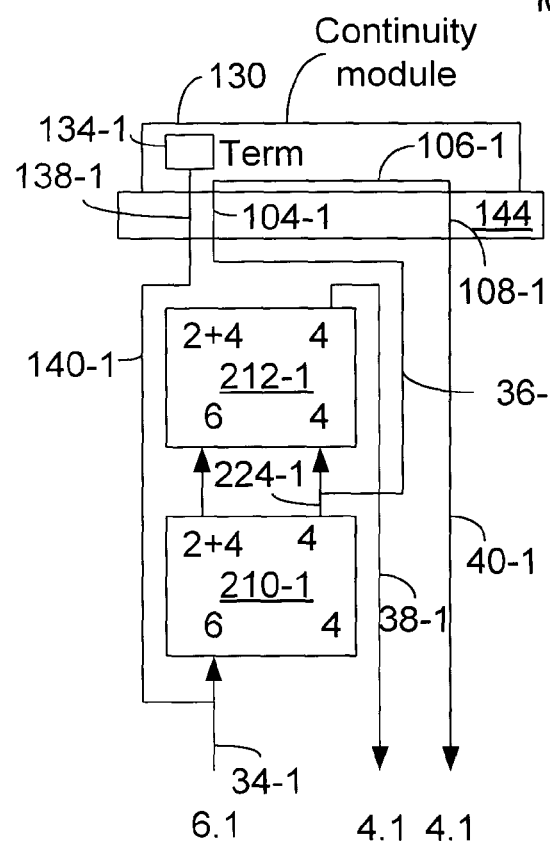
Figure 12:
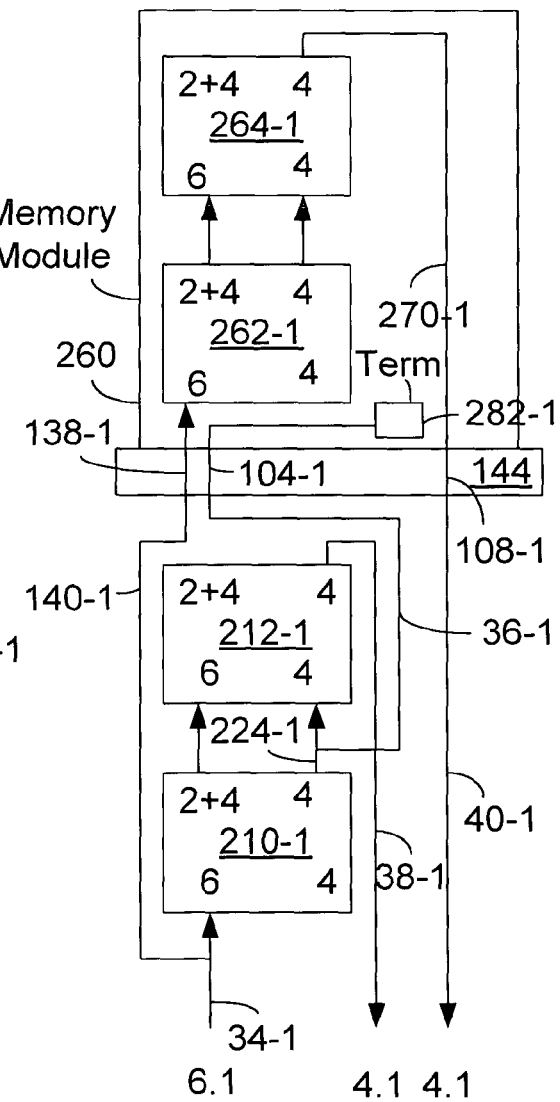

The systems of FIGS. 11 and 12 are like the systems of FIGS. 9 and 10, except that in FIGS. 11 and 12, conductors 140-1 are connected to conductors 34-1, and in FIGS. 9 and 10, conductors 140-1 are connected to conductors 220-1. The systems of FIGS. 5, 6, 9, 10, 13, and 14 may be called a cascaded arrangement in that command, address, and write data signals are repeated by chip 210-1, whereas the system of FIGS. 7, 8, 11, and 12 may be called a point to two point arrangement because the initial command, address, and write data signals are sent to both chips 210-1 and the module connector in parallel.

Figure 13:
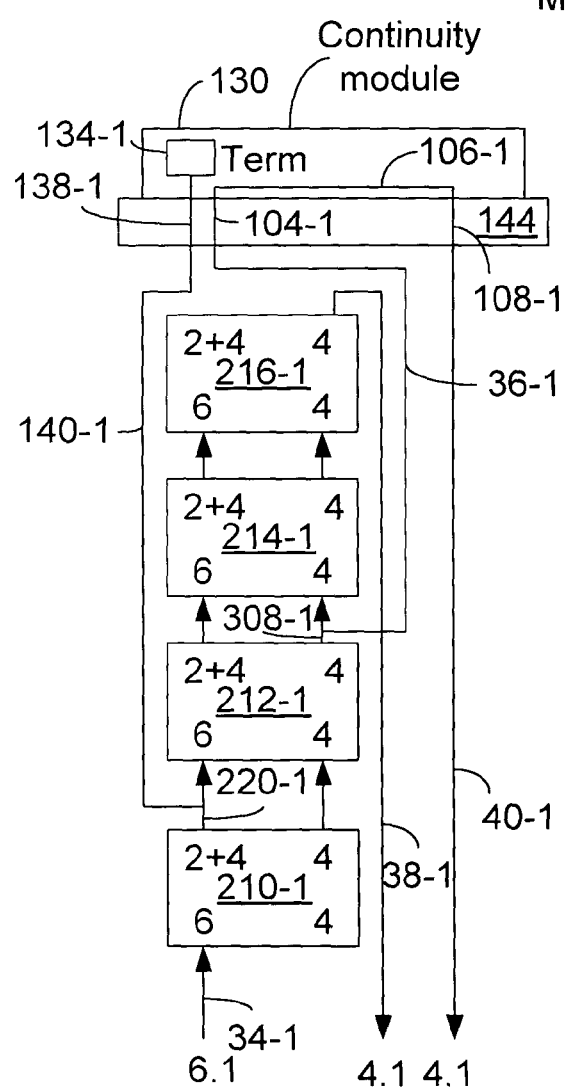
Figure 14:
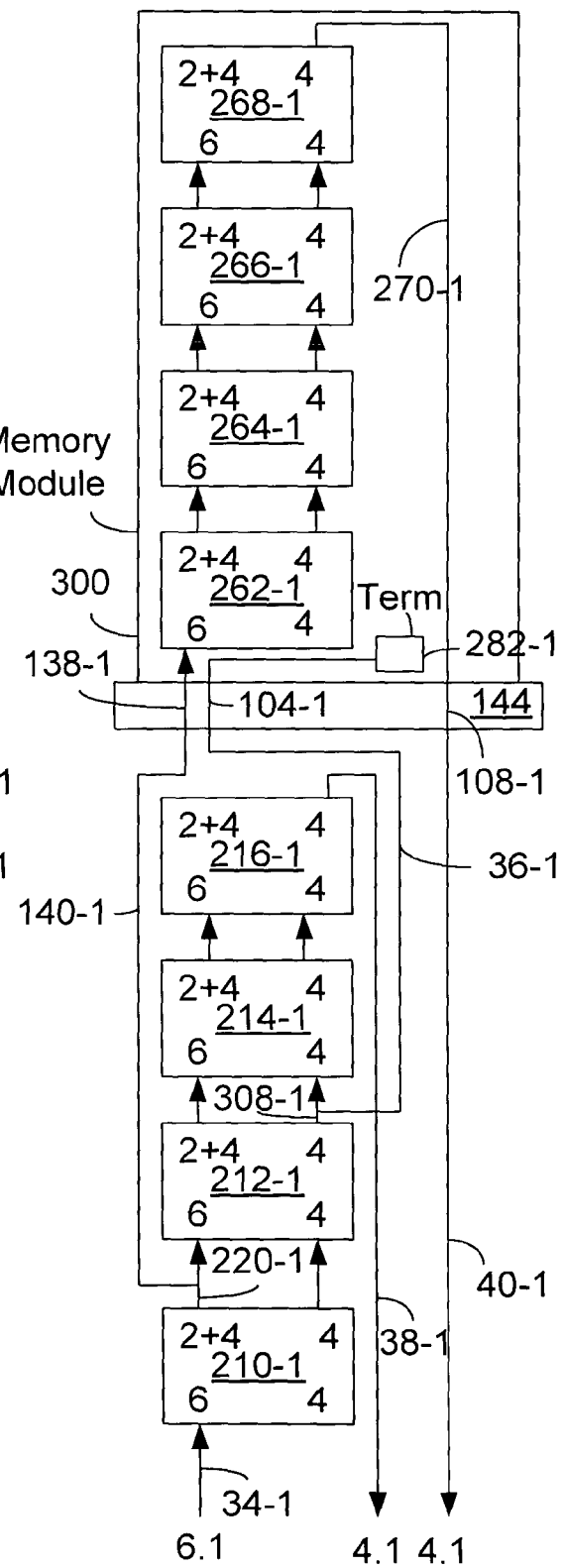

The systems of FIGS. 13 and 14 are similar to the systems of FIGS. 9 and 10, except the system of FIGS. 13 and 14 include two additional memory chips (214-1 and 216-1) on the motherboard and two additional memory chips (266-12 and 268-1) on memory module 300. Referring to FIGS. 13 and 14, conductors 36-1 are coupled to conductors 308-1 between chips 212-1 and 214-1. In memory module 300, termination circuits 282-1 terminate signals on conductors 36-1. As with FIGS. 9 and 10, a particular transaction can be addressed to one of down memory chips 210-1 . . . 216-1 and one up memory chips 262-1 . . . 268-1 or more than one of chips 210-1 . . . 216-1 and more than one of chips 262-1 . . . 268-1.

In the case of FIG. 13 (when continuity module 130 is in inserted connector 144), in response to a read transaction, four read data signal bits are on conductors 40-1 (from chip 210-1 and/or 212-1) and four read data signal bits are on conductors 38-1 (from chip 214-1 and/or 216-1). In the case of FIG. 14 (when memory module 300 is in inserted connector 144), in response to a read transaction, four read data signal bits are on conductors 38-1 (from chip 210-1, 212-1, 214-1, and/or 216-1) and four read data signal bits are on conductors 40-1 (from chip 262-1, 264-1, 266-1, and/or 216-1).

The systems of FIG. 5-14 show only one byte lane (which may include eight data conductor lanes and two clock lanes). In practice, there could be more bytes lanes. For example, there might be four byte lanes (N=4 in FIG. 1) or some other number of bytes lanes. There may be an additional byte lane for error correction code (ECC) memory chips, but that is not required. Optional ECC may be implemented in another way.

Figure 15:
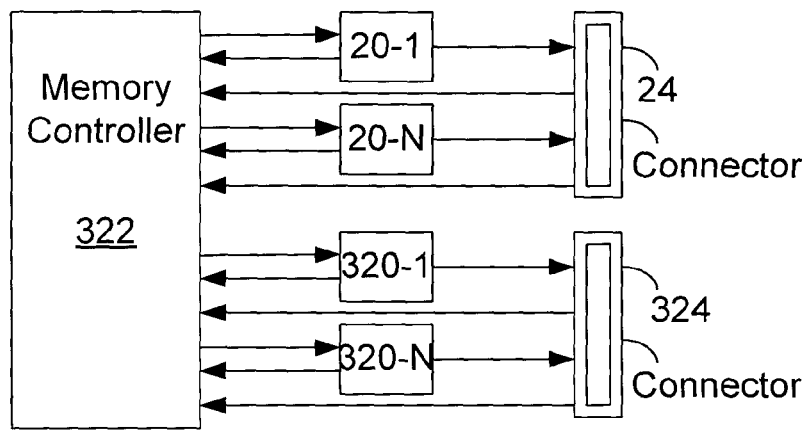
FIG. 15 is a block diagram representation of a system including a memory controller chip, memory chips, and connectors according to some embodiments of the inventions.

FIG. 15 illustrates a memory controller chip 322 (which may be the same as or different than memory controller chips 12 and 32) coupled to conductors 24 and 324 through memory chips 20-1 . . . 20-N and 320- . . . 320-N. The first channel includes conductors between memory controller chip 322 and connector 24. A second channel includes conductors between memory controller chip 322 and connector 324. Other possibilities exist.

Figures 16, 17:
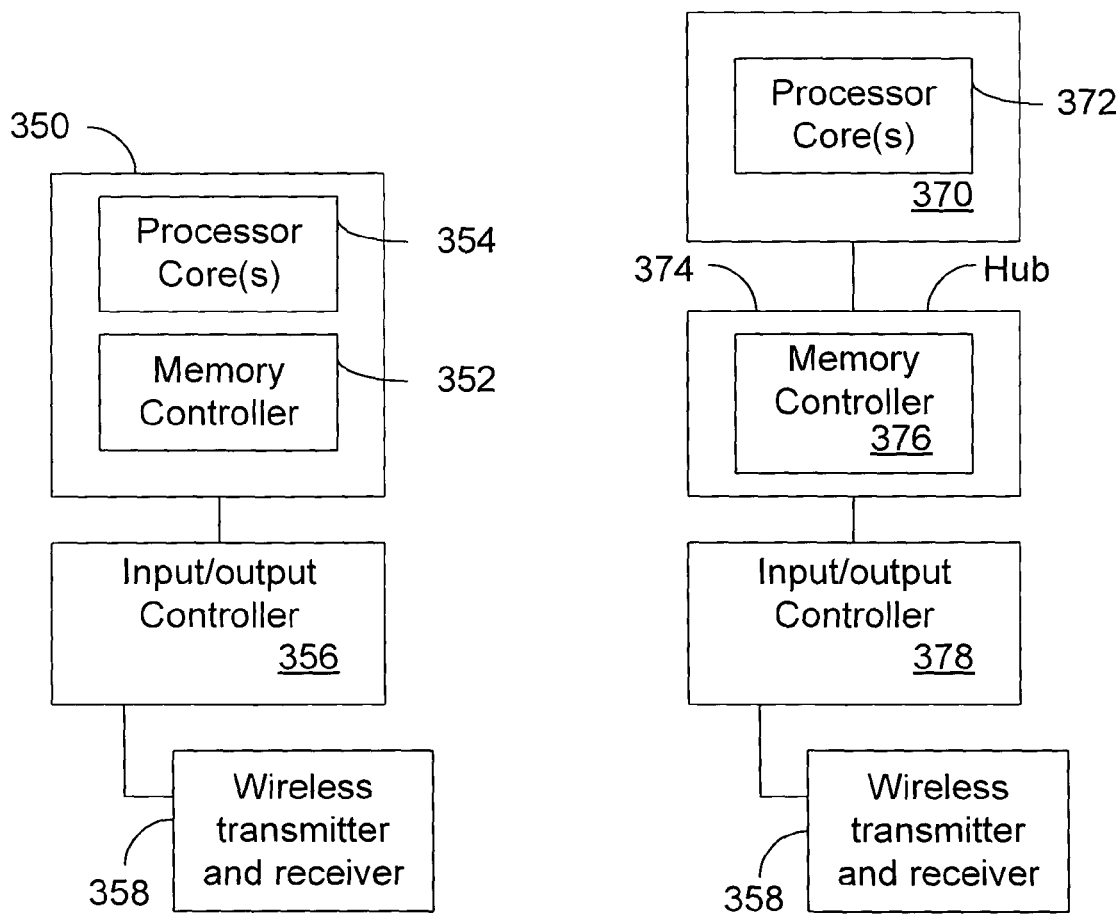
FIGS. 16 and 17 are each a block diagram representation of a system with a memory controller chip according to some embodiments of the inventions.

FIGS. 16 and 17 illustrate systems in which the memory controller chip of the inventions may be used. Memory controller chip 350 in FIG. 16 and memory controller chip 374 in FIG. 17 represent any of the memory controller chips described herein. Referring to FIG. 16, chip 350 includes a memory controller 352 and at least one processor core 354. Chip 350 is coupled to input/output controller 356, which in turn is coupled to wireless transmitter circuits and receiver circuits 358. In FIG. 17, chip 374 include a memory controller 376 which is coupled to a chip 370 which includes at least one processor core 372 and is also coupled to an input/output controller 378. Input/output controller 378 is coupled to wireless transmitter circuits and receiver circuits 358. Wireless transmitter and receiver circuits 358 are not required for all embodiments. Each of the chips in FIGS. 16 and 17 can be on a motherboard or other surface.

There are various ways in which the memory chips may be notified as to whether a continuity module or memory module is in the connector. Examples include the memory controller reading from a non-volatile memory on the continuity module or memory module that indicates what they are. The memory controller then can send appropriate commands to the memory chips. Another approach is for the memory controller to determine whether there are memory chips on the module. In some embodiments, a change may be allowed only prior to boot up and in other embodiments hot plugging also may be allowed.

In some embodiments, the motherboard includes positions for the memory controller chip, memory chips, and connector to be connected directly or indirectly to the motherboard. The positions can be those locations in which these chips and the connector make proper contact with conductive elements of the motherboard.

As noted in connection with FIG. 1, a memory controller chip 12, memory chips 20-1 . . . 20-N, and module connector 24 are on a motherboard 10. By saying a chip or connector is "on the motherboard" it means that the chip or connector is on the motherboard rather than on another card (such as a memory module). There may be intermediate structure (other than a card) between the motherboard and the memory controller chip, memory chips, and connector. For example, the chips may be packaged and have leads, and there may be a heat sink or other materials between a chip and the motherboard and still have the chips be on the motherboard.

Motherboard 10 is an example of a substrate. In some embodiments, memory chips 20-1 . . . 20-N and module connector 24 may be on a substrate other than a motherboard. In some embodiments, memory controller chip 12 is on a card that is supported by the substrate that supports memory chips 20-1 . . . 20-N.

OTHER INFORMATION AND EMBODIMENTS

The conductors mentioned herein do not have to be of continuous material. For example, they may include vias or other connection structures.

The memory chips may be all part of the same rank or may be part of different ranks. There could be memory modules in series.

The inventions are not restricted to any particular signaling techniques or protocols. For example, the signaling may be single ended or differential. The signaling may include only two voltage levels or more than two voltage levels. The signaling may be single data rate, double data rate, quad data rate, or octal data, etc. The signaling may involve encoded symbols and/or packetized signals. A clock (or strobe) signal may be transmitted separately from the other signals or embedded in the other signals. Various coding techniques may be used. Strobe signals could be used rather than clock signals. Write buffers may be included in the memory chips. The write data signals do not have to be on the same conductor lanes as the address and command signals.

There may be intermediate structure between the memory controller chip, memory chips, and connector and the motherboard. The various chips described or illustrated herein may have additional inputs or outputs which are not illustrated or described. In actual implementations of the systems of the figures, there would be additional circuitry, control lines, and perhaps interconnects which are not illustrated. When the figures show two blocks connected through conductors, there may be intermediate circuitry that is not illustrated. The shape and relative sizes of the blocks is not intended to relate to actual shapes and relative sizes.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments.

When it is said the element "A" is coupled to element "B," element A may be directly coupled to element B or be indirectly coupled through, for example, element C.

When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B."

If the specification states a component, feature, structure, process, or characteristic "may", "might", or "could" be included, that particular component, feature, structure, process, or characteristic is not required to be included. If the specification or claim refers to "a" or "an" element, that does not mean there is only one of the element.

The inventions are not restricted to the particular details described herein. Indeed, many other variations of the foregoing description and drawings may be made within the scope of the present inventions. Accordingly, it is the following claims including any amendments thereto that define the scope of the inventions.

What is claimed is:

1. A system comprising:
    a memory controller chip, memory chips, and a module connector each on a motherboard;
    a first group of conductors to provide signals from the memory controller chip to at least some of the memory chips;
    a second group of conductors to provide signals from at least some of the memory chips to the connector;
    a third group of conductors to provide read data signals from at least some of the memory chips to the memory controller chip; and
    a fourth group of conductors to provide read data signals from the connector to the memory controller chip,
    wherein a continuity module inserted in the connector is to couple the second and fourth groups of conductors.

2. The system of claim 1, wherein the at least some memory chips that receive the signals from the first group of conductors, the at least some memory chips that provide the signals to the second group of conductors, and the at least some memory chips that provide the read data signals to the third groups of conductors are the same memory chips.

3. The system of claim 1, wherein the at least some memory chips that receive the signals from the first group of conductors are different memory chips than the at least some memory chips that provide the read data signals to the third group of conductors.

4. The system of claim 1, further comprising a memory module inserted in the connector and including memory chips at least some of which are to receive signals from the second group of conductors and at least some of which are to provide the read data signals to the connector for the fourth group of conductors.

5. The system of claim 1, further comprising a fifth group of conductors connected between the first group of conductors and the connector.

6. The system of claim 1, further comprising a fifth group of conductors coupled between outputs of some of the memory chips and the connector.

7. The system of claim 1, further comprising a memory module inserted in the connector and including termination circuitry to receive signals from the second group of conductors.

8. The system of claim 1, wherein the third and fourth groups of conductors are point-to-point conductors and wherein an initial command, address data signal, and write data signal are sent to both the memory chips and the module connector in parallel.

9. The system of claim 4, wherein the at least some memory module memory chips that receive the signals from the second group of conductors and the at least some memory module memory chips that provide the read data signals to the connector for the fourth group of conductors are the same memory chips.

10. The system of claim 4, wherein the at least some memory module memory chips that receive the signals from the second group of conductors are different memory chips than the at least some memory module memory chips that provide the read data signals to the connector for the fourth group of conductors.

11. The system of claim 5, further comprising a memory module inserted in the connector and including memory chips at least some of the which are to receive the signals on the fifth group of conductors and at least some of which are to provide the read data signals to the connector for the fourth group of conductors.

12. The system of claim 6, further comprising a memory module inserted in the connector and including memory chips at least some of the which are to receive the signals on the fifth group of conductors and at least some of which are to provide the read data signals to the connector for the fourth group of conductors.

* * * * *

UNITED STATES PATENT AND TRADEMARK OFFICE
CERTIFICATE OF CORRECTION

| | | |
|---|---|---|
| PATENT NO. | : 7,990,737 B2 | Page 1 of 1 |
| APPLICATION NO. | : 11/317778 | |
| DATED | : August 2, 2011 | |
| INVENTOR(S) | : Randy B. Osborne | |

It is certified that error appears in the above-identified patent and that said Letters Patent is hereby corrected as shown below:

In column 8, line 12, in Claim 3, delete "group" and insert -- groups --, therefor.

Signed and Sealed this
Thirty-first Day of January, 2012

David J. Kappos
*Director of the United States Patent and Trademark Office*